United States Patent
Linzer

(10) Patent No.: US 8,659,683 B1
(45) Date of Patent: Feb. 25, 2014

(54) DIGITAL PICTURE NOISE REDUCTION BY COMBINING HIGH-NOISE AND LOW-NOISE PROCESSED PICTURES

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 750 days.

(21) Appl. No.: 12/731,372

(22) Filed: Mar. 25, 2010

(51) Int. Cl.
*H04N 5/217* (2011.01)

(52) U.S. Cl.
USPC .............................. 348/241; 348/222.1

(58) Field of Classification Search
USPC ................................ 348/222.1, 241
See application file for complete search history.

(56) References Cited

U.S. PATENT DOCUMENTS

| | | | |
|---|---|---|---|
| 6,529,640 B1 * | 3/2003 | Utagawa et al. | 382/284 |
| 7,536,487 B1 | 5/2009 | Kohn | 345/503 |
| 7,567,301 B2 * | 7/2009 | Higashi | 348/671 |
| 2006/0215908 A1 * | 9/2006 | Kamon et al. | 382/167 |
| 2009/0033773 A1 * | 2/2009 | Kinoshita et al. | 348/241 |
| 2009/0185057 A1 * | 7/2009 | Lee et al. | 348/241 |
| 2010/0220223 A1 * | 9/2010 | Tsuruoka | 348/242 |
| 2012/0154596 A1 * | 6/2012 | Wajs | 348/164 |

\* cited by examiner

*Primary Examiner* — Anthony J Daniels
(74) *Attorney, Agent, or Firm* — Christopher P. Maiorana, PC

(57) ABSTRACT

A method for processing a digital picture is disclosed. The method may include steps (A) to (C). Step (A) may generate a first picture by processing the digital picture using a first noise reduction technique in a circuit. Step (B) may generate a second picture by processing the digital picture using a second noise reduction technique. The first noise reduction technique may achieve a higher noise reduction than the second noise reduction technique. Step (C) may generate an output picture by combining the first picture and the second picture.

19 Claims, 5 Drawing Sheets

DIGITAL PICTURE NOISE REDUCTION BY COMBINING HIGH-NOISE AND LOW-NOISE PROCESSED PICTURES

CROSS REFERENCE TO RELATED APPLICATIONS

The present application is related to co-pending U.S. application Ser. No. 12/706,816 filed Feb. 17, 2010, and Ser. No. 12/712,307 filed Feb. 25, 2010, and U.S. Pat. No. 7,536,487, which are hereby incorporated by reference in their entirety.

FIELD OF THE INVENTION

The present invention relates to a method and/or architecture for digital picture processing generally and, more particularly, to a digital picture noise reduction by combining high-noise and low-noise processed pictures.

BACKGROUND OF THE INVENTION

Noise reduction techniques for digital pictures are understood in the art. A tradeoff commonly exists in that more aggressive noise reduction can make a picture less noisy, but often results in making the picture blurry or unnatural. In particular, very aggressive noise reduction can reduce low-frequency (wide grain) noise to an acceptable level. However, such noise reduction can also make a picture devoid of nearly all high frequency content, which makes the picture look unnatural. For example, the aggressive noise reduction can make smooth areas, or areas of low-contrast signals appear completely flat.

It is desirable to have methods of digital picture noise reduction that achieves both high levels of noise compression and maintains a natural look to the picture.

SUMMARY OF THE INVENTION

The present invention concerns a method for processing a digital picture. The method may include steps (A) to (C). Step (A) may generate a first picture by processing the digital picture using a first noise reduction technique in a circuit. Step (B) may generate a second picture by processing the digital picture using a second noise reduction technique. The first noise reduction technique may achieve a higher noise reduction than the second noise reduction technique. Step (C) may generate an output picture by combining the first picture and the second picture.

The objects, features and advantages of the present invention include providing a digital picture noise reduction by combining high-noise and low-noise processed pictures that may (i) achieve a high level of noise reduction, (ii) maintain a natural look to the digital picture, (iii) apply multiple color processing techniques in parallel, (iv) reduce noise at different frequencies by different amounts and/or (v) apply multiple color correction techniques in parallel.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
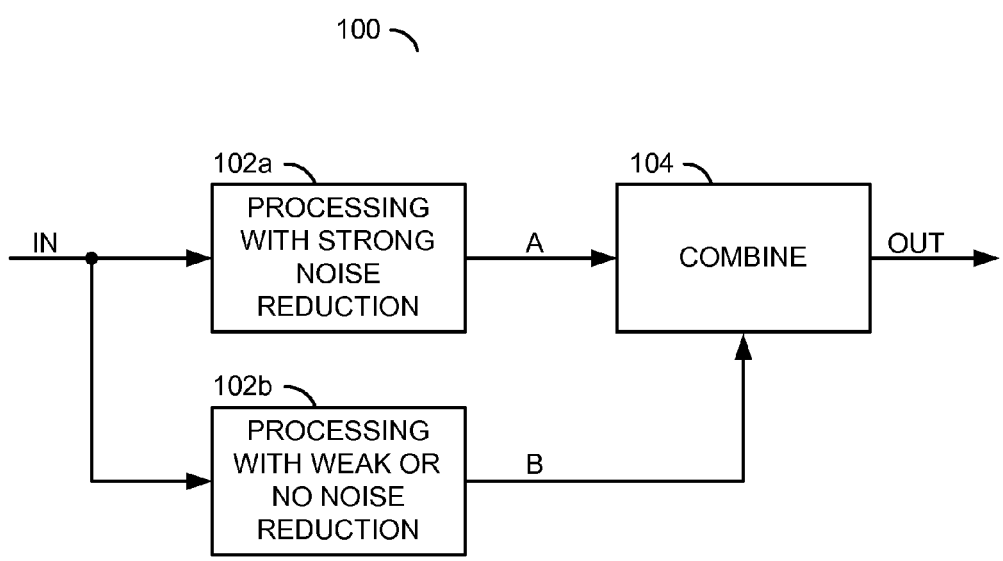
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or device) 100 may form part of a digital still camera, a camcorder, a set-top box, an optical video disk player and/or a television. The apparatus 100 generally comprises a circuit (or module) 102a, a circuit (or module) 102b and a circuit (or module) 104. An input signal (e.g., IN) may be received by both the circuit 102a and the circuit 102b. The circuit 102a may generate a signal (e.g., A) that is received by the circuit 104. The circuit 102b may generate a signal (e.g., B) that is received by the circuit 104. An output signal (e.g., OUT) may be generated and presented by the circuit 104. The circuits 102a to 104 may be implemented in hardware, software, firmware or any combination thereof.

The signal IN may carry one or more original digital pictures. The original digital pictures may comprise an array of pixels arranged in a particular color pattern. In some embodiments, a Bayer Color Filter Array (CFA) pattern may be received. In other embodiments, a red-green-blue (RGB) pattern may by used. In still other embodiments, a luminance-and-chrominance (e.g., YUV) pattern may be used by the original digital pictures. Other color schemes may be implemented to meet the criteria of a particular application.

The signal OUT may carry one or more final digital pictures. Samples in the final digital pictures may be arranged in the CFA, RGB and/or YUV patterns. Other color schemes may be implemented to meet the criteria of a particular application. Since the final digital pictures generally incorporate portions of the original digital pictures with low noise reduction, the final digital pictures may look more natural.

The circuit 102a may implement a processing circuit. The circuit 102a is generally configured to process the digital pictures received in the signal IN using a strong noise reduction technique. The resulting noise reduced pictures may be presented in the signal A to the circuit 104. In addition to the noise reduction, the processing may include, but is not limited to demosaicing, color correction, tone correction and color space conversion.

The circuit 102b may also implement a processing circuit. The circuit 102b is generally configured to process the digital pictures received in the signal IN using either a weak noise reduction technique or no noise reduction at all. Generally, the noise reduction employed by the circuit 102a is greater than the noise reduction employed by the circuit 102b. The noise reduced pictures generated by the circuit 102b may be presented in the signal B to the circuit 104. In addition to the noise reduction, the processing may include, but is not limited to demosaicing, color correction, tone correction and color space conversion.

The circuit 104 may implement a combine circuit. The circuit 104 is generally operational to combine a picture from the signal A and a picture from the signal B to create a final digital picture in the signal OUT. The combination may include, but is not limited to, filtering operations, weighted averaging operations and addition operations.

Generally, a single original digital picture received by the apparatus 100 may undergo a strong noise reduction in the circuit 102a and a weak/no noise reduction in the circuit 102b. The two processed pictures may be carried by signals A and B to the circuit 104. The circuit 104 may combine the two pictures back together to create a single final digital picture.

Figure 2:
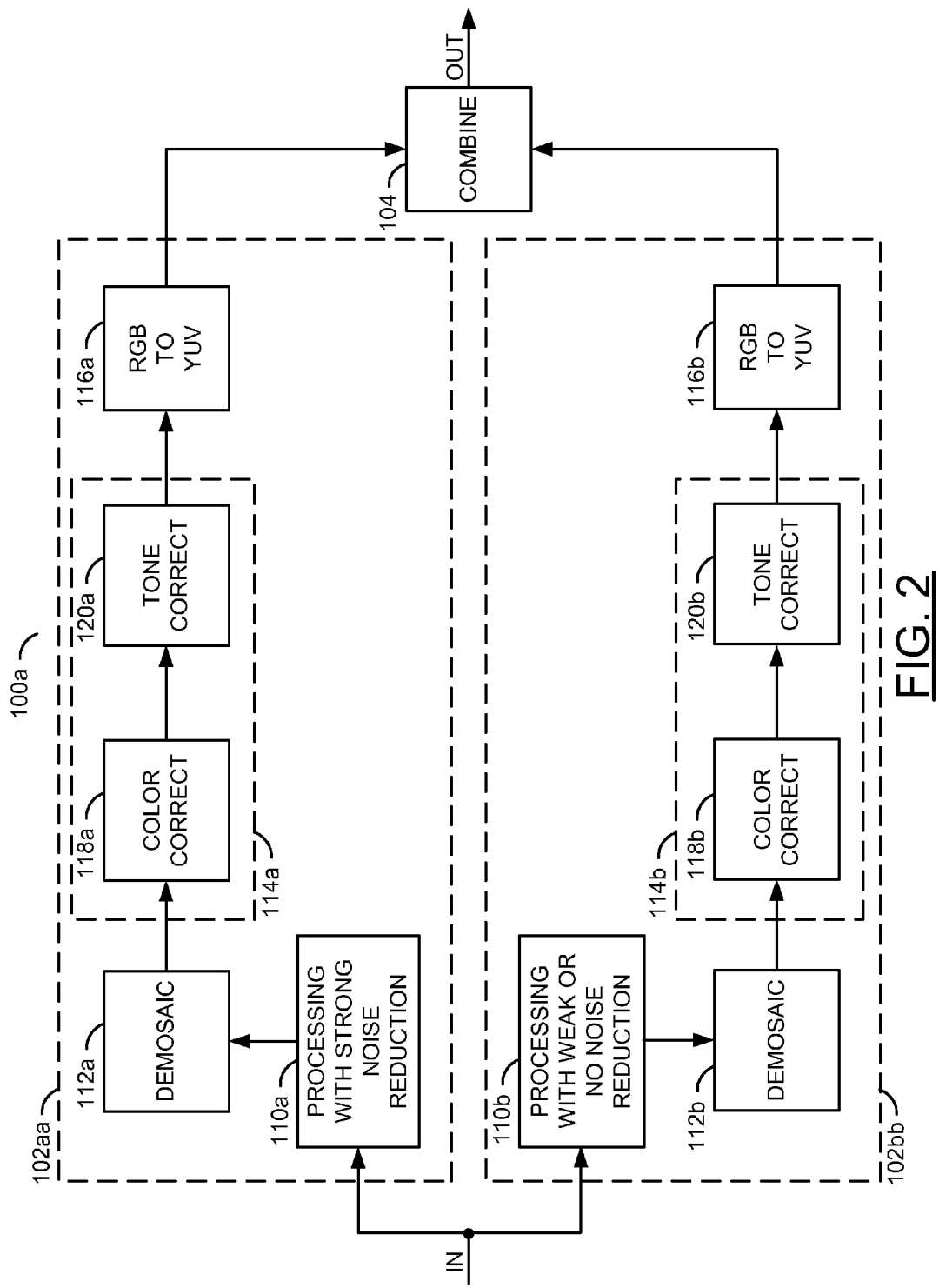
FIG. 2 is a block diagram of an example implementation of a processing circuit of the apparatus.

Referring to FIG. 2, a block diagram of an example implementation of a processing circuit of an apparatus 100a is shown. The apparatus 100a may be the same as or a variation of the apparatus 100. The apparatus 100a generally comprises a circuit (or module) 102aa, a circuit (or module) 102bb and the circuit 104. The signal IN may be received by both the circuits 102aa and 102bb. The circuit 102aa may generate the signal A. The signal B may be generated by the circuit 102bb. The circuits 102aa and 102bb may be implemented in hardware, software, firmware or any combination thereof. The circuit 102aa may be the same as or a variation of the circuit 102a. The circuit 102bb may be the same as or a variation of the circuit 102b.

The combine step performed by the circuit 104 may be done in a different domain from the noise reduction steps performed by the circuits 102aa and/or 102bb. For example, the original digital pictures may be received by the apparatus 100a in the CFA domain. Noise reduction may subsequently be performed in the CFA domain. Each circuit 102aa and 102bb may convert the corresponding pictures into the RGB domain and then into the YUV domain before sending the pictures to the circuit 104. The circuit 104 may therefore combine the noise reduced pictures in the YUV domain. In the above case, all of the steps that may be used to convert between CFA and YUV (e.g., demosaic, color correction, tone correction, RGB to YUV conversion) are generally done for both the high noise reduced pictures and the low noise reduced pictures.

The circuit 102aa generally comprises a circuit (or module) 110a, a circuit (or module) 112a, a circuit (or module) 114a and a circuit (or module) 116a. The circuit 110a may receive the signal IN. The signal A may be generated by the circuit 116a. The circuits 110a-116a may be connected in a sequence to process an original digital picture from the CFA domain to the YUV domain. The circuits 110a to 116a may be implemented in hardware, software, firmware or any combination thereof.

The circuit 102bb generally comprises a circuit (or module) 110b, a circuit (or module) 112b, a circuit (or module) 114b and a circuit (or module) 116b. The circuit 110b may receive the signal IN. The signal B may be generated by the circuit 116b. The circuits 110b-116b may be connected in a sequence to process an original digital picture from the CFA domain to the YUV domain. The circuits 110b to 116b may be implemented in hardware, software, firmware or any combination thereof.

The circuits 110a and 110b may implement processing circuits. The circuit 110a is generally operational to perform the strong noise reduction technique. The circuit 110b is generally operational to perform the weak noise reduction technique or no noise reduction technique.

The circuits 112a and 112b may implement demosaic circuits. Each circuit 112a and 112b is generally operational to convert the color space of the noise reduced pictures from the CFE domain to another (e.g., RGB) domain.

The circuits 114a and 114b may implement color processing circuits. Each circuit 114a and 114b is generally operational to color correct and tone correct the noise reduced pictures. Color correction may be achieved by a circuit (or module) 118a within the circuit 114a and a circuit (or module) 118b within the circuit 114b. Tone correction may be achieved by a circuit (or module) 120a within the circuit 114a and a circuit (or module) 120b within the circuit 114b.

The circuits 116a and 116b may implement conversion circuits. Each circuit 116a and 116b may be operational to convert the digital pictures from a starting color space (e.g., RGB) to an ending color space (e.g., YUV). The circuits 118a to 120b may be implemented in hardware, software, firmware or any combination thereof. In some embodiments, the color corrections (e.g., 118a and 118b) and/or the color space conversions (e.g., 116a and 116b) may implement a lookup-table based correction method. The lookup-table based methods are generally described in co-pending U.S. application Ser. No. 12/706,816 and Ser. No. 12/712,307, both of which are incorporated by reference in their entirety.

Figure 3:
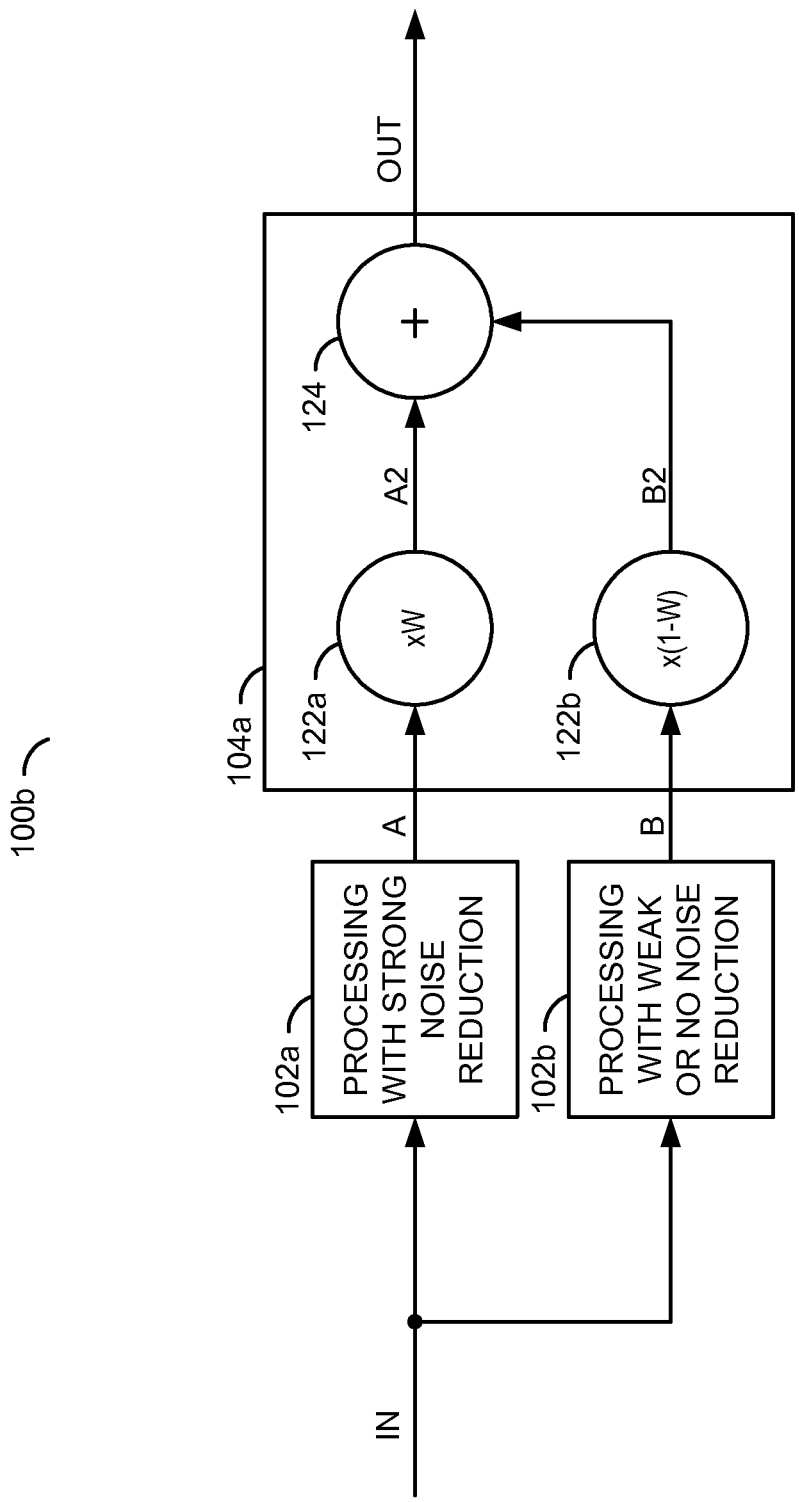
FIG. 3 is a block diagram of an example implementation of a combine circuit of the apparatus.

Referring to FIG. 3, a block diagram of an example implementation of a combine circuit of an apparatus 100b is shown. The apparatus 100b may be the same as or a variation of the apparatus 100 and/or 100a. The apparatus 100b generally comprises the circuit 102a, the circuit 102b and a circuit (or module) 104a. The circuit 104a may be the same as or a variation of the circuit 104. The circuits 102a to 104a may be implemented in hardware, software, firmware or any combination thereof.

The circuit 104a generally performs a per-sample weighted averaging to compute the output picture. As a weighting factor (e.g., W) is increased, more of the "strong noise reduced" picture may be used to construct the final picture. As the weighting factor W is decreased, more of the "low or no noise reduced" picture may be used to construct the final picture.

The circuit 104a generally comprises a circuit (or module) 122a, a circuit (or module) 122b and a circuit (or module) 124. The circuits 122a to 124 may be implemented in hardware, software, firmware or any combination thereof. The signal A may be received by the circuit 122a. A signal (e.g., A2) may be generated by the circuit 122a and received by the circuit 124. The signal B may be received by the circuit 122b. A signal (e.g., B2) may be generated by the circuit 122b and received by the circuit 124. The circuit 124 may generate the signal OUT.

The circuit 122a may implement a weighting circuit. The circuit 122a is generally operational to scale the noise filtered pictures received via the signal A by the weighting factor W. The weighting factor W may have value ranging from zero to one. The digital picture received in the signal A may be multiplied (e.g., scaled) by W. The resulting scaled picture may be presented in the signal A2.

The circuit 122b may implement another weighting circuit. The circuit 122b is generally operational to scale the noise filtered pictures received via the signal B based on a difference between unity and the weighting factor W. The digital picture received in the signal B may be multiplied (e.g., scaled) by (1−W). The resulting scaled picture may be presented in the signal B2.

The circuit 124 may implement an adder circuit. The circuit 124 is generally operational to add the scaled picture received in the signal A2 with the scaled picture received in the signal B2. The addition may be performed on a sample-by-sample basis, depending on the color domain. For example, in the YUV color domain (i) the luminance components (e.g., Y) of the two scaled pictures may be added, (ii) the chrominance components (e.g., U) of the two scaled pictures may be added and (iii) the other chrominance components (e.g., V) may be added. In the RGB domain, (i) the red components of the two scaled pictures may be added, (ii) the blue components of the two scaled pictures may be added and (iii) the green components of the two scaled pictures may be added.

Figure 4:
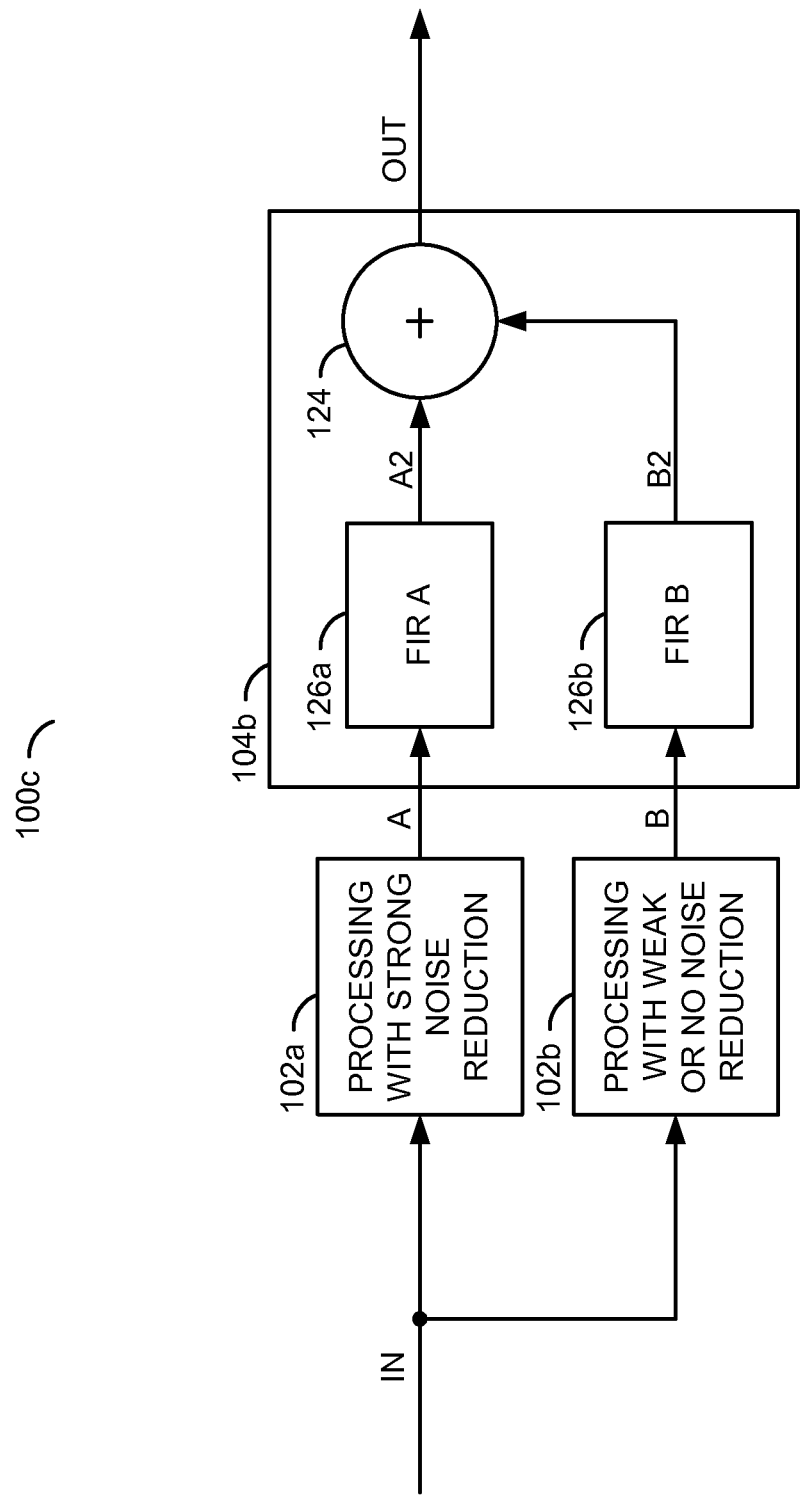
FIG. 4 is a block diagram of another example implementation the combine circuit.

Referring to FIG. 4, a block diagram of another example implementation of the combine circuit of an apparatus 100c is shown. The apparatus 100c may be the same as or a variation of the apparatus 100, 100a and/or 100b. The apparatus 100c generally comprises the circuit 102a, the circuit 102b and a circuit (or module) 104b. The circuit 104b may be the same as or a variation of the circuits 104 and/or 104a. The circuits 102a-104b may be implemented in hardware, software, firmware or any combination thereof.

In the circuit 104b, each of the "strong noise reduced" pictures and the "low or no noise reduced" pictures are passed through a corresponding two-dimensional Finite Impulse Response (FIR) filter and subsequently added together. Appropriate selection of the parameters in the two FIR filters may select how much of the different frequencies are passed from each of the two pictures. For example, the parameters of a lowpass FIR may pass the lower frequencies and block the higher frequencies of a picture because the strong noise reduction has suppressed most of the higher frequencies. Conversely, the parameters of a high-pass FIR may pass the higher frequencies and block the lower frequencies of a picture to restore details lost in the lowpass FIR.

The circuit 104b generally comprises a circuit (or module) 126a, a circuit (or module) 126b and the circuit 124. The circuits 124 to 126b may be implemented in hardware, software, firmware or any combination thereof. The signal A may be received by the circuit 126a. The signal A2 may be generated by the circuit 126a and received by the circuit 124. The signal B may be received by the circuit 126b. The signal A2 may be generated by the circuit 126b and received by the circuit 124. The circuit 124 may generate the signal OUT.

The circuit 126a may implement a filter circuit. The circuit 126a may be operational to filter the digital pictures received in the signal A. The filtered pictures may be presented in the signal A2. In some embodiments, the filtering may be achieved with a FIR filter technique. Other filtering techniques may be implemented to meet the criteria of a particular application.

The circuit 126b may implement a filter circuit. The circuit 126b may be operational to filter the digital pictures received in the signal B. The filtered pictures may be presented in the signal B2. In some embodiments, the filtering may be achieved with a FIR filter technique. Other filtering techniques may be implemented to meet the criteria of a particular application. In some embodiments, the filtering of the circuit 126a may be the same as the filtering of the circuit 126b. In other embodiments, the circuits 126a and 126b may have dissimilar filtering characteristics. For example, the circuit 126a may implement a lowpass filter and the circuit 126b may implement a high-pass filter.

Figure 5:
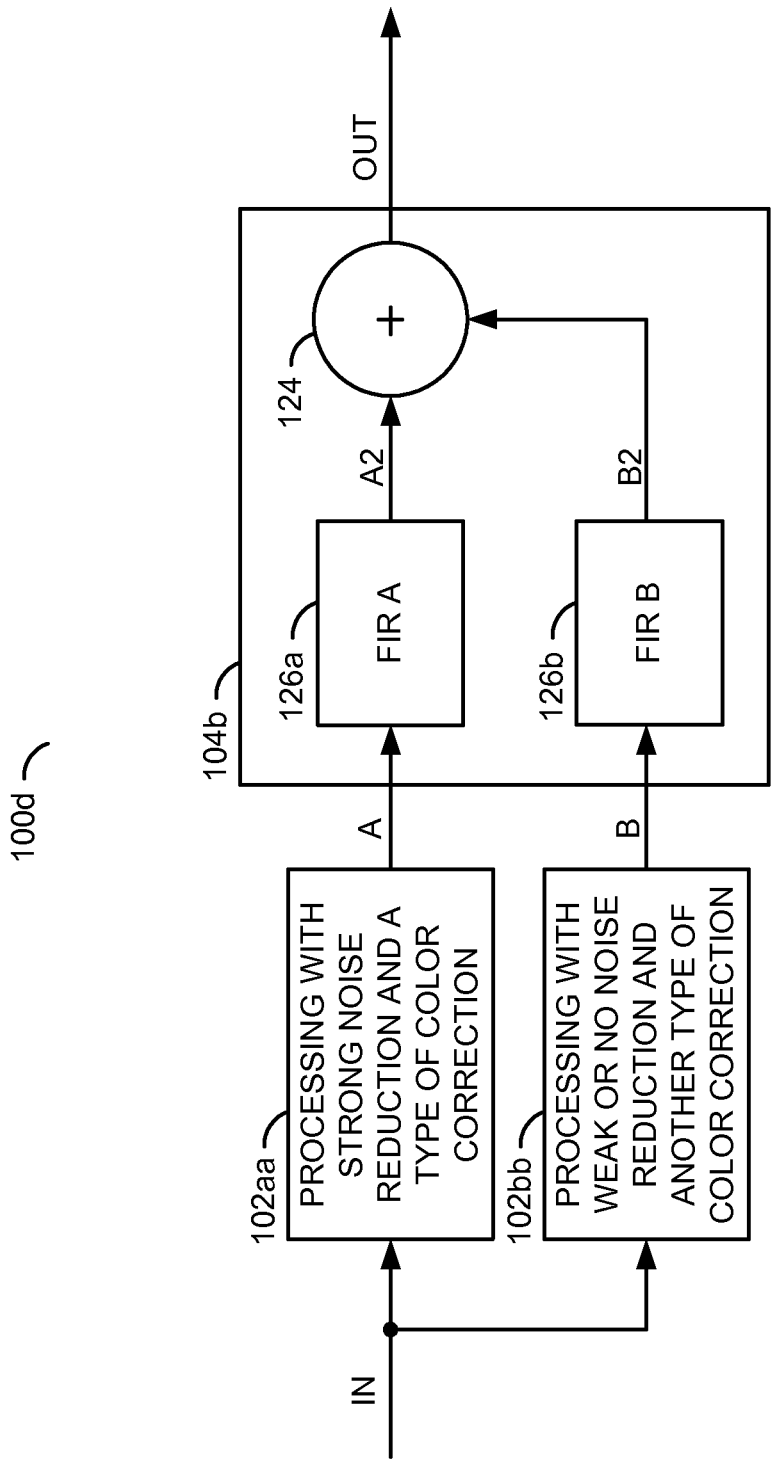
FIG. 5 is a block diagram of another example implementation of the processing circuit.

Referring to FIG. 5, a block diagram of another example implementation of the processing circuit of an apparatus 100d is shown. The apparatus 100d may be the same as or a variation of the apparatus 100, 100a, 100b and/or 100c. The apparatus 100d generally comprises the circuit 102aa, the circuit 102bb and the circuit 104b.

As before, the digital pictures in the signal A generally use strong noise reduction and may be passed through the circuit 126a for filtering. The digital pictures in the signal B may use weak or no noise reduction and may be passed through the circuit 126b for filtering. Additionally, circuits 102aa (e.g., 118a) and 102bb (e.g., 118b) may implement different color corrections. The different color corrections may be beneficial because a single color correction optimized to make the final picture color realistic and/or aesthetically pleasing may amplify noise. In some embodiments, the color corrections and FIR filters may be configured as follows:

1) Filtering in the circuit 126a generally has a mean of zero such that (i) no DC (e.g., zero frequency) signal is passed through, (ii) low frequencies are substantially attenuated and (iii) high frequencies are passed through.

2) Color correction in the circuit 118a may be optimized to make the final picture color realistic and/or aesthetically pleasing.

3) Color correction in the circuit 118b may cause little or no noise amplification due to the color correction. By way of example, a raw (e.g., Bayer) picture may be processed in the circuit 102bb. The processing may include white balance and tone correction, but not color correction (e.g., converting input RGB to output RGB). After tone correction in the circuit 120b, conversion to luminance and chrominance may be performed in the circuit 116b.

With the apparatus 100d, the color in the final picture may be realistic and/or aesthetically pleasing than with common techniques. The good results are generally achieved because the lowest frequencies come from the circuit 102aa, which has color correction optimized to make colors realistic and/or aesthetically pleasing. Furthermore, the noise in the final picture may be reduced, compared with the common techniques. A reason may be that while the circuit 102bb causes little or no noise reduction, the circuit 102bb generally does not introduce noise amplification in the color correction (e.g., 118b).

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. A method for processing a digital picture, comprising the steps of:
    (A) generating a first picture by processing said digital picture using a first noise reduction technique in a circuit;
    (B) generating a second picture by processing said digital picture using a second noise reduction technique, wherein said first noise reduction technique always achieves a higher noise reduction at a plurality of high frequencies in said digital picture than said second noise reduction technique; and
    (C) generating an output picture by combining said first picture and said second picture, wherein said first picture and said second picture have a same size during said combining.

2. The method according to claim 1, further comprising the steps of:
    scaling an amplitude of said first picture using a first weight value; and
    scaling an amplitude of said second picture using a second weight value, wherein said combining of said first picture and said second picture comprises adding said first picture as scaled and said second picture as scaled.

3. The method according to claim 1, further comprising the step of:
    filtering said first picture using a first finite impulse response filter configured to pass a plurality of low frequencies.

4. The method according to claim 3, further comprising the step of:
    filtering said second picture using a second finite impulse response filter configured to pass said high frequencies.

5. The method according to claim 4, wherein said combining comprises adding said first picture as filtered to said second picture as filtered.

6. The method according to claim 4, further comprising the steps of:
    modifying said first picture using a first color processing technique; and
    modifying said second picture using a second color processing technique, wherein said first color processing technique and said second color processing technique have dissimilar color transfer characteristics in one or more of (i) a color correction technique, (ii) a tone correction technique and (iii) a color space conversion technique.

7. The method according to claim 6, wherein (i) said first color processing technique includes said color correction technique and (ii) said second color processing technique does not perform color correcting.

8. The method according to claim 1, further comprising the steps of:
    modifying said first picture using a first color processing technique configured to operate on a plurality of colors in said first picture at a time; and
    modifying said second picture using a second color processing technique, wherein said first color processing technique and said second color processing technique have dissimilar color transfer characteristics in one or more of (i) a color correction technique, (ii) a tone correction technique and (iii) a color space conversion technique.

9. The method according to claim 8, wherein (i) said first color processing technique includes said color correction technique and (ii) said second color processing technique does not perform color correcting.

10. The method according to claim 1, further comprising the step of:
    demosaicing both said first picture and said second picture from one color domain to another color domain.

11. An apparatus comprising:
    a circuit configured to (i) generate a first picture by processing a digital picture using a first noise reduction technique, (ii) generate a second picture by processing said digital picture using a second noise reduction technique and (iii) generate an output picture by combining said first picture and said second picture, wherein (i) said first noise reduction technique always achieves a higher noise reduction at a plurality of high frequencies in said digital picture than said second noise reduction technique and (ii) said first picture and said second picture have a same size during said combining.

12. A method for processing a digital picture, comprising the steps of:
    (A) generating a first picture by processing said digital picture using a first color processing technique in a circuit;
    (B) generating a second picture by processing said digital picture using a second color processing technique, wherein said first color processing technique and said second color processing technique have dissimilar color transfer characteristics in one or more of (i) a color correction technique, (ii) a tone correction technique and (iii) a color space conversion technique;
    (C) converting both said first picture and said second picture from a red-green-blue color space to a YUV color space after both said first color processing technique and said second color processing technique, respectfully; and (D) generating, after the converting step, an output picture by combining said first picture and said second picture, wherein said first picture and said second picture have a same size during said combining.

13. The method according to claim 12, wherein (i) said processing of said digital picture to generate said first picture further uses a first noise reduction technique, (ii) said processing of said digital picture to generate said second picture further uses a second noise reduction technique and (iii) said first noise reduction technique always achieves a higher noise reduction at a plurality of high frequencies in said digital picture than said second noise reduction technique.

14. The method according to claim 12, further comprising the steps of:

scaling an amplitude of said first picture using a first weight value; and scaling an amplitude of said second picture using a second weight value, wherein said combining of said first picture and said second picture comprises adding said first picture as scaled and said second picture as scaled.

15. The method according to claim 12, further comprising the step of:

filtering said first picture using a first two-dimensional finite impulse response filter.

16. The method according to claim 15, further comprising the step of:

filtering said second picture using a second two-dimensional finite impulse response filter, wherein said second finite impulse response filter and said first finite impulse response filter have dissimilar frequency responses.

17. The method according to claim 12, wherein (i) said first color processing technique includes said color correction configured to make a final color more realistic by operating on a plurality of colors in said first picture at a time and (ii) said second color processing technique does not perform color correcting.

18. The method according to claim 12, further comprising the step of:

demosaicing both said first picture and said second picture from one color domain to another color domain.

19. An apparatus comprising: a circuit configured to (i) generate a first picture by processing a digital picture using a first color processing technique, (ii) generate a second picture by processing said digital picture using a second color processing technique, wherein said first color processing technique and said second color processing technique have dissimilar color transfer characteristics in one or more of (a) a color correction technique, (b) a tone correction technique and (c) a color space conversion technique and (iii) generate generating an output picture by combining said first picture and said second picture, wherein said first picture and said second picture have a same size during said combining, wherein the circuit is further configured to convert both said first picture and said second picture from a red-green-blue color space to a YUV color space prior to being combined and after both said first color processing technique and said second color processing technique, respectfully.

* * * * *